United States Patent
Geng et al.

(10) Patent No.: US 11,329,720 B2
(45) Date of Patent: May 10, 2022

(54) RANGING METHOD FOR OPTICAL NETWORK, OLT, ONU, AND OPTICAL NETWORK SYSTEM

(71) Applicant: ZTE Corporation, Shenzhen (CN)

(72) Inventors: Dan Geng, Shenzhen (CN); Liquan Yuan, Shenzhen (CN); Weiliang Zhang, Shenzhen (CN); Zhuang Ma, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/279,399

(22) PCT Filed: Sep. 24, 2019

(86) PCT No.: PCT/CN2019/107501
§ 371 (c)(1),
(2) Date: Mar. 24, 2021

(87) PCT Pub. No.: WO2020/063581
PCT Pub. Date: Apr. 2, 2020

(65) Prior Publication Data
US 2021/0391922 A1    Dec. 16, 2021

(30) Foreign Application Priority Data
Sep. 25, 2018 (CN) .......................... 201811121306.7

(51) Int. Cl.
*H04B 10/079* (2013.01)
*H04B 10/25* (2013.01)
*H04B 10/27* (2013.01)

(52) U.S. Cl.
CPC ......... *H04B 10/0795* (2013.01); *H04B 10/25* (2013.01); *H04B 10/27* (2013.01)

(58) Field of Classification Search
CPC ..... H04B 10/0795; H04B 10/25; H04B 10/27
(Continued)

(56) References Cited

U.S. PATENT DOCUMENTS

2013/0272699 A1* 10/2013 Liang .................. H04J 3/0682
                                                                 398/45
2014/0161436 A1*  6/2014 Lee ..................... H04B 10/272
                                                                 398/1
(Continued)

FOREIGN PATENT DOCUMENTS

CN         102075820 A        5/2011
CN         102082976 A        6/2011
(Continued)

OTHER PUBLICATIONS

International Search Report for corresponding application PCT/CN2019/107501 filed Sep. 24, 2019; dated Nov. 28, 2019.

*Primary Examiner* — Dalzid E Singh
(74) *Attorney, Agent, or Firm* — Cantor Colburn LLP

(57) ABSTRACT

A ranging method for an optical network, an OLT, an ONU, and an optical network system are provided. The OLT sends a bandwidth allocation message to the ONU; an OLT receiving a response message sent by an ONU in a first sending mode, wherein the first sending mode comprises sending power and a transmission rate; and the OLT performs ranging on the ONU according to the response message.

20 Claims, 2 Drawing Sheets

(58) Field of Classification Search
USPC .......................................................... 398/25
See application file for complete search history.

(56) References Cited

U.S. PATENT DOCUMENTS

| 2014/0199069 | A1  |  7/2014 | Garavaglia |              |
|--------------|-----|---------|------------|--------------|
| 2014/0241724 | A1  |  8/2014 | Mcgarry    |              |
| 2015/0171965 | A1* |  6/2015 | Ohteru     | H04Q 11/0067 |
|              |     |         |            | 398/58       |
| 2017/0279527 | A1* |  9/2017 | Kim        | H04B 10/272  |
| 2019/0356389 | A1* | 11/2019 | Weeber     | H04B 10/40   |
| 2019/0386743 | A1* | 12/2019 | Yin        | H04B 10/40   |

FOREIGN PATENT DOCUMENTS

| CN | 103841475 A       | 6/2014 |              |
|----|-------------------|--------|--------------|
| CN | 104871515 A       | 8/2015 |              |
| WO | WO-2012028014 A1* | 3/2012 | H04Q 11/0067 |

\* cited by examiner

RANGING METHOD FOR OPTICAL NETWORK, OLT, ONU, AND OPTICAL NETWORK SYSTEM

CROSS REFERENCE

This application is a National Stage Filing of the PCT International Application No. PCT/CN2019/107501 filed on Sep. 24, 2019, which claims priority to Chinese Patent Application No. 201811121306.7 filed before China National Intellectual Property Administration (CNIPA) on Sep. 25, 2018, the entirety of which is herein incorporated by reference.

TECHNICAL FIELD

This disclosure relates to, but is not limited to, the field of communications.

BACKGROUND

In the related art, a large amount of services such as voice, data, and video can be transmitted by using a network, so that a requirement for a bandwidth of the network is continuously increased, and a Passive Optical Network (PON) is generated under such a requirement.

FIG. 1 is a topology structure diagram of a PON system in the related art. The PON system is generally composed of an Optical Line Terminal (OLT) at a central office side, a number of Optical Network Units (ONUs) at a user side, and an Optical Distribution Network (ODN), and generally adopts a point-to-multipoint network structure. The ODN is composed of passive optical devices such as single-mode optical fibers, optical splitters and optical connectors, and provides an optical transmission medium for a physical connection between the OLT and the ONUs. Currently, development of low latency services such as virtual reality services and 5G wireless services puts forward a low latency service requirement on a PON.

SUMMARY

An aspect of the embodiments of the present disclosure provides a ranging method for an optical network, including the following operations. An OLT performs coarse ranging on an ONU to be registered to determine a first distance between the ONU to be registered and the OLT. The OLT sends, at a first time $T_1$, a first message to the ONU to be registered, wherein the first message carries a first uplink bandwidth allocated by the OLT to the ONU to be registered. The OLT estimates, according to the first distance, a time at which a first uplink signal, which is sent on the first uplink bandwidth in a first sending mode by the ONU to be registered in response to the first message, arrives at the OLT, and opens a corresponding first silent window. The OLT receives a first uplink signal at a second time $T_2$ within the first silent window. The OLT determines a second distance between the ONU to be registered and the OLT according to the first time $T_1$ and the second time $T_2$.

Another aspect of the embodiments of the present disclosure provides another ranging method for an optical network, including the following operations. An ONU to be registered communicates with an OLT, so that the OLT performs coarse ranging on the ONU to be registered to determine a first distance between the ONU to be registered and the OLT. The ONU to be registered receives a first message sent by the OLT at a first time $T_1$, wherein the first message carries a first uplink bandwidth allocated by the OLT to the ONU to be registered. In response to the first message, the ONU to be registered sends a first uplink signal on the first uplink bandwidth in a first sending mode, so that the OLT receives the first uplink signal in a first silent window, and determines, according to the first time $T_1$ and a second time $T_2$ at which the OLT receives the first uplink signal, a second distance between the ONU to be registered and the OLT. In the embodiment, the first silent window is opened after the OLT estimates, according to the first distance, a time at which the first uplink signal arrives at the OLT.

Another aspect of the embodiments of the present disclosure provides another ranging method for an optical network, applied in an OLT and including the following operations. A bandwidth allocation message is sent to an ONU. A response message sent by the ONU in a first sending mode is received, wherein the first sending mode includes a sending power and a transmission rate. A first ranging is performed on the ONU according to the response message.

Another aspect of the embodiments of the present disclosure provides a ranging method for an optical network, applied to an ONU and including the following operations. A bandwidth allocation message sent by an OLT is received. A response message of the bandwidth allocation message is sent to the OLT in a first sending mode, wherein the first sending mode includes a sending power and a transmission rate.

Another aspect of the embodiments of the present disclosure provides an OLT, including: a sending module, configured to send a bandwidth allocation message to an ONU; a receiving module, configured to receive a response message sent by the ONU in a first sending mode, wherein the first sending mode includes a sending power and a transmission rate; and a ranging module, configured to perform a first ranging on the ONU according to the response message.

Another aspect of the embodiments of the present disclosure provides an ONU, including: a receiving module, configured to receive a bandwidth allocation message sent by an OLT; and a sending module, configured to send a response message of the bandwidth allocation message to the OLT in a first sending mode, wherein the sending mode includes a sending power and a transmission rate.

Another aspect of the embodiments of the present disclosure provides an optical network system, including an OLT and at least one ONU. The OLT is configured to send a bandwidth allocation message to the ONU, and receive a response message sent by the ONU in a first sending mode which includes a sending power and a transmission rate, and perform a first ranging on the ONU according to the response message. The ONU is configured to receive the bandwidth allocation message sent by the OLT, and send the response message of the bandwidth allocation message to the OLT in the first sending mode.

Yet another aspect of the embodiments of the present disclosure provides a computer readable storage medium on which a computer program is stored. The computer program is configured to execute the operations of the ranging method for the optical network according to any one of the described aspects at runtime.

Still another aspect of the embodiments of the present disclosure provides an electronic device, including a memory and a processor. The memory stores a computer program, and the processor is configured to run the computer program to execute the operations of the ranging method for the optical network according to any one of the described aspects.

DETAILED DESCRIPTION OF THE EMULSIONS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

In the related art, at an ONU registration stage, an OLT needs to perform ranging on an ONU to be registered. Since the OLT does not know a distance from the ONU to be registered to the OLT in advance, the size of a silent window opened by the OLT and used for ranging covers a minimum distance to a maximum distance supported by a PON system, and a distance difference between the maximum distance and the minimum distance is generally 20 km or 40 km. In a PON system supporting a differential distance of 20 km, it is recommended in the standard that a round-trip delay difference value between a nearest ONU and a farthest ONU is 200 µs, a response time difference value of the ONU is 2 µs, and a maximum random delay of the ONU is 48 µs, therefore, the recommended size of the silent window is 250 µs. In a PON system supporting a 40 km differential distance, it is recommended in the standard that a round-trip delay difference value between a nearest ONU and a farthest ONU is 400 µs, a response time difference value of the ONU is 2 µs, and a maximum random delay of the ONU is 48 µs, therefore, the recommended size of the silent window is 450 µs. During the period when the OLT opens the silent window, the OLT does not allocate an uplink bandwidth to an ONU which has completed registration, and thus the ONU which has completed registration cannot send uplink data within a time corresponding to the silent window. If a registered ONU that transmits a low latency service exists in the system, the ONU that transmits a low latency service cannot tolerate opening of a large silent window by the PON system because a large silent window may cause delayed transmission of the low latency service. However, in a related PON system, an OLT periodically opens a silent window for ONU registration, so that the PON system cannot meet a low latency requirement of a low latency service.

Figure 1:
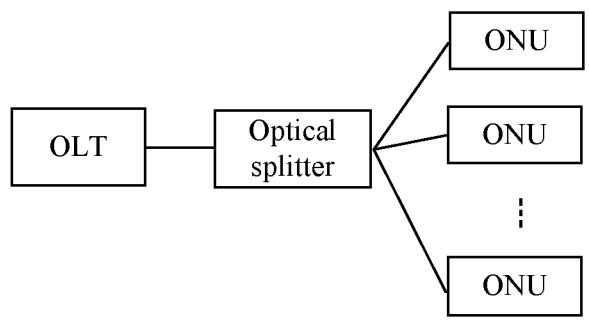
FIG. 1 is a topology structure diagram of a PON system in the related art.
Figure 2:
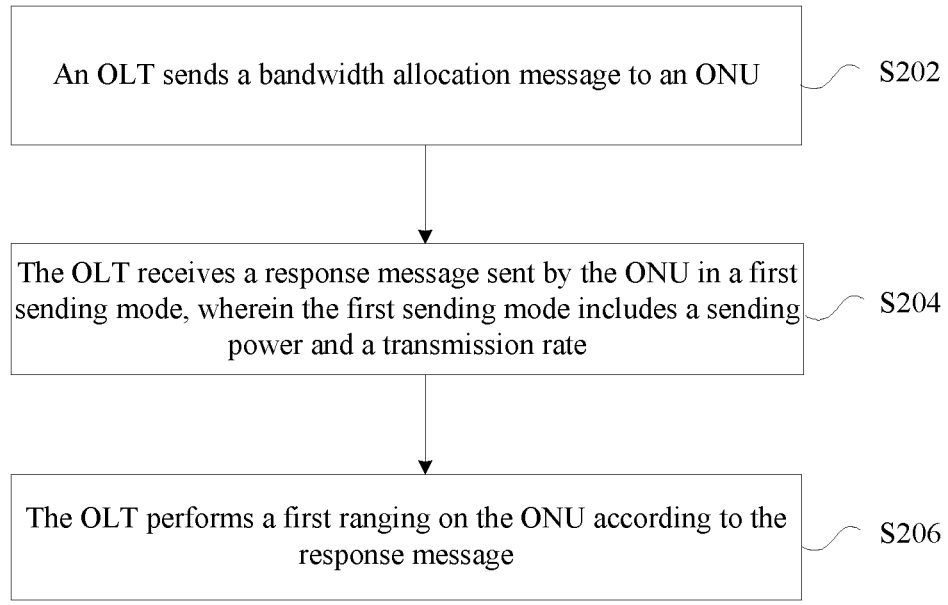
FIG. 2 is a schematic flowchart of a ranging method for an optical network according to an embodiment of the present disclosure.

In view of this, the embodiments of the present disclosure provide a ranging method for an optical network. The method may be applied to the optical network architecture as shown in FIG. 1. FIG. 2 is a schematic flowchart of a ranging method for an optical network according to an embodiment of the present disclosure. The method may include operations S202 to S206.

In operation S202, an OLT sends a bandwidth allocation message to an ONU.

In operation S204, the OLT receives a response message sent by the ONU in a first sending mode, wherein the first sending mode includes a sending power and a transmission rate.

In operation S206, the OLT performs first ranging on the ONU according to the response message.

According to some embodiments of the present disclosure, by performing the first ranging (ranging for the first time) on the ONU, the OLT can open a silent window with a time length smaller than the allowable delay of the low latency service according to the arrival time of the response message of the ONU. In the silent window, the OLT may perform a second ranging (ranging for the second time) on the ONU, i.e., accurate ranging (fine ranging) and complete the registration of the ONU, thereby solving the technical problem in the related art that the service latency of the OLT is too great, and ensuring the low latency requirement for transmitting the service on the uplink.

According to some embodiments of the present disclosure, the execution subject of the foregoing operations may be, but is not limited to, an OLT or a management unit of the OLT.

According to an embodiment of the present disclosure, after the OLT performs the first ranging on the ONU according to the response message, the method may further include a second ranging (ranging for the second time), wherein the first ranging is coarse ranging and the second ranging is fine ranging (or accurate ranging). The fine ranging may include the following operations. The OLT sends downlink data to the ONU. The OLT receives an uplink signal which is sent in response to downlink data by the ONU in a second sending mode, wherein a sending power and a transmission rate under the second sending mode are higher than the sending power and the transmission rate under the first sending mode. The OLT performs the second ranging on the ONU according to a receiving time of the uplink signal.

According to some embodiments of the present disclosure, the operation that the OLT receives the response message sent by the ONU in the first sending mode may be implemented in the following manner. The OLT receives, in a predetermined opened window of a signal frame, the response message sent by the ONU in the first sending mode, wherein the predetermined opened window corresponds to a non-operating bandwidth.

According to some embodiments of the present disclosure, the operation of performing, by the OLT, the first ranging on the ONU according to the response message may be implemented in the following manner. The OLT acquires a data frame carrying the response message. The OLT determines a specified time at which a first bit of the data frame arrives at the OLT. The OLT measures the distance between the ONU and the OLT based on the specified time.

According to some embodiments of the present disclosure, the operation of performing, by the OLT, the second ranging on the ONU according to the receiving time of the uplink signal may be implemented in the following manner. The OLT determines a sending time of downlink data and a receiving time of the uplink signal. The OLT calculates a difference between the receiving time and the sending time to obtain a round-trip delay (RTD) of the ONU.

According to some embodiments of the present disclosure, after the OLT receives the response message sent by the ONU in the first sending mode, the method may further include the following operations. The OLT determines that response messages of a plurality of ONUs are received in the same period; and the OLT instructs the ONU to resend the response message after generating a random delay.

According to some embodiments of the present disclosure, the sending power under the first sending mode may be less than a standard power of a PON system and the transmission rate under the first sending mode may be less than a standard rate of the PON system. The standard power and standard rate are defined in the standards of the PON system, for example, the sending power is less than −30 dBm, and the transmission rate is less than 10 Mbps.

According to some embodiments of the present disclosure, the operation of sending, by the OLT, the bandwidth allocation message to the ONU may be implemented in the following manner. The OLT divides a plurality of ONUs under the control of the OLT into groups of ONUs. The OLT sends bandwidth allocation messages to the ONUs of each group respectively.

According to some embodiments of the present disclosure, the operation of sending, by OLT, the downlink data to the ONU may be implemented in the following manner. The OLT sends a unicast message to the ONU, wherein the unicast message carries the downlink data. The OLT may send one or more unicast messages to the ONU, and the ONU may respond the one or more unicast messages one by one.

According to some embodiments of the present disclosure, after the OLT performs the ranging (the coarse ranging) on the ONU according to the response message, the method may further include the following operations. The OLT instructs the target ONU to be registered to send, after generating a random delay, an uplink signal in a first sending mode. Then the OLT receives the uplink signal.

According to some embodiments of the present disclosure, after the OLT receives the uplink signal, the method may further include the following operations. The OLT compares data content of the uplink data with a complete sequence code with a specific value to obtain a time at which a first bit of the sequence code with the specific value sent by the ONU arrives at the OLT. The OLT calculates a round-trip delay of the target ONU according to the obtained time.

According to some embodiments of the present disclosure, after the OLT performs the ranging (the coarse ranging) on the ONU according to the response message, the method may further include the following operations. The OLT opens a silent window with a time length smaller than an allowable delay of a low latency service for the ONU.

According to some embodiments of the present disclosure, after the OLT performs the ranging (the coarse ranging) on the ONU according to the response message, the method may further include the following operation. The OLT instructs the ONU to be registered to send identity information of the ONU to be registered to the OLT in the first sending mode.

Figure 3:
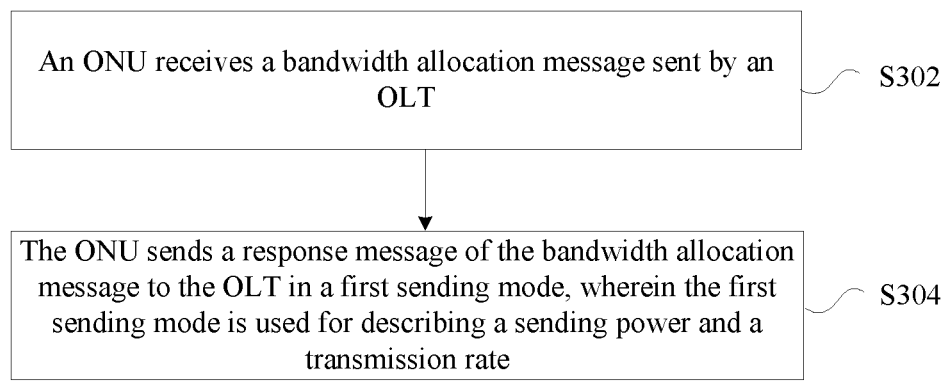
FIG. 3 is a schematic flowchart of another ranging method for an optical network according to an embodiment of the present disclosure.

An embodiment of the present disclosure provides another ranging method for an optical network, which may be applied to the optical network architecture shown in FIG. 1. FIG. 3 is a schematic flowchart of another ranging method for an optical network according to an embodiment of the present disclosure. As shown in FIG. 3, the method may include operations S302 and S304.

In operation S302, an ONU receives a bandwidth allocation message sent by an OLT.

In operation S304, the ONU sends a response message of the bandwidth allocation message to the OLT in a first sending mode, wherein the first sending mode includes a sending power and a transmission rate.

According to some embodiments of the present disclosure, after the ONU sends the response message of the bandwidth allocation message to the OLT in the first sending mode, the method may further include the following operations. The ONU receives downlink data sent by the OLT. The ONU sends an uplink signal in response to the downlink data to the OLT in a second sending mode, wherein a sending power and a transmission rate under the second sending mode are higher than the sending power and the transmission rate under the first sending mode.

According to some embodiments of the present disclosure, frame content of the uplink signal sent in a low rate and low-power by the ONU carries identity information of the ONU, for example, the frame content of the uplink signal may carry serial number information, media access address information, or other registration information of the ONU.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

An optical network device is also provided in the present embodiment. The device is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 4:
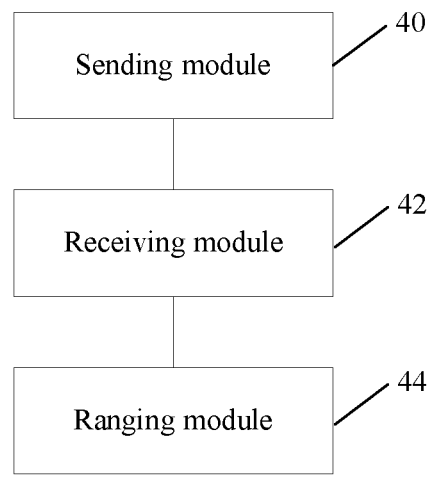
FIG. 4 is a schematic structural diagram of an OLT according to an embodiment of the present disclosure.

FIG. 4 is a schematic structural diagram of an OLT according to an embodiment of the present disclosure. The OLT may include: a sending module 40, configured to send a bandwidth allocation message to an ONU; a receiving module 42 configured to receive a response message sent by the ONU in a first sending mode, wherein the sending mode includes a sending power and a transmission rate; and a ranging module 44, configured to perform first ranging on the ONU according to the response message.

Figure 5:
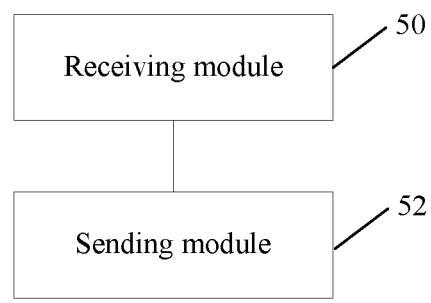
FIG. 5 is a schematic structural diagram of an ONU according to an embodiment of the present disclosure.

FIG. 5 is a schematic structural diagram of an ONU according to an embodiment of the present disclosure. The ONU may include: a receiving module 50, configured to receive a bandwidth allocation message sent by an OLT; and a sending module 52 configured to send a response message of the bandwidth allocation message to the OLT in a first sending mode, wherein the first sending mode includes a sending power and a transmission rate.

An embodiment of the present disclosure also provides an optical network system, which may include the OLT shown in FIG. 4 and at least one ONU shown in FIG. 5.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

According to the embodiments of the present disclosure, the OLT performs ranging on the ONU to be registered twice. Before performing accurate ranging (fine ranging) on the ONU to be registered, the OLT performs coarse ranging on the ONU to be registered. Then, the OLT sends a unicast message to a certain ONU to be registered to instruct the ONU to be registered to respond to the request of the OLT. Based on the described coarse ranging, the OLT can open a silent window with a time length smaller than an allowable delay of a low latency service according to the time of arrival of the ONU to be registered. In the described silent window, the OLT performs accurate ranging (fine ranging) on the ONU to be registered, thereby completing the registration of the ONU to be registered.

Embodiments of the present disclosure will be described in detail below through specific examples.

Example 1

In this example, to prevent the OLT from opening a large silent window for registration of the ONUs to be registered, the ONUs to be registered support two signal sending modes. In the initial stage of registration, the ONU to be registered may support sending a low-power (for example, sending an optical signal with a power less than −30 dBm) low-rate signal $S_d$ (for example, an uplink rate less than 10 Mbps) in response to the bandwidth allocated by the OLT. When the ONU to be registered sends a low-rate low-power signal, a registered ONU may send uplink data normally. The OLT normally allocates an uplink bandwidth to a registered ONU, and the registered ONU sends an uplink signal. Meanwhile, the OLT periodically sends a message to the ONU to be registered to notify the ONU to be registered to send an uplink signal. The ONU to be registered responds to the OLT by sending an uplink signal with a low power at a low rate. Because the low-rate low-power uplink signal overlaps with the normal uplink data signal sent by the registered ONU, the low-rate low-power signal is submerged in the normal uplink data signal sent by the registered ONU. In order to detect a low-rate low-power signal of an ONU to be registered, an OLT opens a small silent window (for example, several microseconds) in each frame, and the OLT does not allocate uplink bandwidth to any registered ONU in the time corresponding to this silent window. Hence, in this period of time, the OLT can detect the low-rate low-power uplink signal sent by the ONU to be registered. To help the OLT to more accurately determine the value of the low-rate low-power uplink signal sent by the ONU to be registered, the ONU to be registered may continuously send a plurality of low-rate low-power uplink signals. The OLT opens a small silent window at the same period of time in each 125 us, and the OLT averages the values of the detected low-rate low-power uplink signals sent by the ONU to be registered, so as to obtain a more accurate value of data carried in the uplink signals sent by the ONU to be registered. The OLT knows the value of a complete low-rate low-power uplink signal sent by the ONU to be registered. Therefore, according to the value of the partial low-rate low-power uplink signal detected in the silent window, the OLT can deduce the position of this segment of data in the complete low-rate low-power uplink signal. The OLT can further deduce the time $T_3$ at which the first bit of the low-rate low-power uplink signal of the ONU to be registered arrives at the OLT according to the uplink rate of the ONU to be registered and the information about the known complete data sent by the ONU to be registered (for example, according to the received data segment, the OLT obtains the data length L between the sent data segments according to the known complete data sent by the ONU to be registered, and obtains the time $T_3=T_2-L/S_d$ at which the data sent by the ONU to be registered arrives at the OLT, where $S_d$ is the value of the low rate the ONU to be registered adopts for sending in the registration phase). According to the foregoing information, the OLT can determine that the round-trip delay (RTD) of the ONU to be registered is $T_3-T_1$, so as to complete the coarse ranging of the ONU to be registered.

In the described solution, if a collision signal is detected at an OLT when a plurality of ONUs to be registered are registered at the same time, the OLT may instruct the ONUs to be registered to generate a random delay and then resend an uplink signal, thereby reducing the probability of collision. Afterward, the OLT performs coarse ranging on the ONUs to be registered according to the foregoing method.

After performing coarse ranging on a certain ONU to be registered, for example, an ONU1, the OLT instructs the ONU1 to send a low-rate low-power uplink signal after a random delay. After receiving the instruction from the OLT, the ONU1 generates a random delay and sends the low-rate low-power uplink signal. The OLT receives the low-rate low-power uplink signal sent by the ONU1 after the random delay, and completes the ranging of the ONU1. The OLT subtracts the ranging result values of the ONU1 measured at the two times to obtain the random delay value D generated by the ONU1.

The OLT sends, at a time $T_4$, a bandwidth used for ranging to the ONU1 that generates the random delay D, and opens, according to the coarse ranging result of the ONU1, a silent window (with a length of, for example, a few microseconds) near the time at which data sent by the ONU1 at a restored transmission rate of the service data in the PON system arrives at the OLT. After receiving the foregoing instruction from the OLT, the ONU1 restores the rate and optical power to be the operation rate and optical power supported by the current PON system, and sends the uplink signal to the OLT in the bandwidth allocated by the OLT in response to the ranging instruction of the OLT. The OLT accurately obtains the round-trip delay (i.e., RTD)=$T_5-T_4$ of the ONU1 under the normal rate according to the time $T_4$ at which the OLT sends the downlink data and the time $T_5$ at which the OLT receives the data from the ONU1.

In this example, in order to reduce the conflict between the ONUs to be registered which may reduce the registration speed of the ONUs to be registered, the OLT may divide all the ONUs into groups. For example, if the OLT supports 32 ONUs, the OLT divides the 32 ONUs into four groups, the first group of ONUs locally records their group number as 1, the second group of ONUs locally records their group number as 2, the third group of ONUs locally records their group number as 3, and the fourth group of ONUs locally records their group number as 4. The OLT and each ONU transmit data and receive data by using the following operations.

In operation 1, the OLT sends a broadcast message to at least one ONU, wherein the message content is a sequence code with a specific value.

In operation 2, the ONU stores information of the sequence code with the specific value sent by the OLT.

In operation 3, the OLT instructs a first group of ONUs to be registered, which is in a to-be-registered and to-be-activated state, to send an uplink signal, and the OLT opens a silent window with a time length smaller than an allowable delay of a low latency service.

In operation 4, the first group of ONUs to be registered sends an optical signal with a low optical power at a low rate, where the content of the optical signal is the sequence code with the specific value in operation 1. In some exemplary implementations, the uplink transmission time of the sequence code with the specific value at this rate may be equal to 125 us. In some exemplary implementations, each ONU to be registered may send the sequence code with the specific value multiple times.

In operation 5, the OLT detects the uplink data sent by the ONU to be registered in operation 4 in the silent window in operation 3, compares the detected data content with the complete sequence code with the specific value, obtains a time at which the first bit of the sequence code with the specific value sent by the ONU to be registered arrives at the OLT, and then calculates the round-trip delay of the ONU to be registered. The round-trip delay includes a transmission delay of the data sent by the OLT to the ONU to be registered in the optical fiber, a response time of the ONU to be registered, and a transmission delay of data sent by the ONU to be registered in the optical fiber. The round-trip delay=a time at which the OLT receives the first bit of the sequence code with the specific value sent by the ONU to be registered arrives at the OLT-a time at which the OLT sends the downlink data.

The OLT instructs the first group of ONUs to be registered to generate a random delay (for example, a random delay less than 125 us) before sending the uplink signal.

In operation 6, after generating the random delay, the first group of ONUs to be registered sends an optical signal with a low optical power at a low rate, and the content of the optical signal is the sequence code with the specific value in operation 1.

In operation 7, after receiving the optical signals sent by the ONU to be registered at a low-rate and low-optical power in operations 4 and 6, the OLT calculates a random delay value D generated by the ONU to be registered. The difference between the calculated round-trip delays of the ONU to be registered at the two instances is the random delay value generated by the ONU to be registered. The OLT instructs the ONU to be registered generating the random delay value D to send uplink data at a start time $T_1$.

The OLT opens a silent window with a time length smaller than the allowable delay of the low latency service according to the arrival time of the ONU to be registered.

In operation 8, for an ONU to be registered generating the random delay value D in operation 6, after restoring the rate and transmission optical power to a normal value of a PON system, this ONU sends uplink data the start time $T_1$, wherein the uplink data includes identity information of the ONU to be registered, such as a serial number S of the ONU to be registered or a MAC address of the ONU to be registered.

In operation 9, after receiving the data sent by the ONU to be registered in operation 8, the OLT performs ranging to obtain the round-trip delay of the ONU to be registered (the round-trip delay of the ONU to be registered=the time at which the OLT receives the data of the ONU to be registered—the time at which the OLT sends the downlink data—$T_1$).

The OLT allocates identity information, such as an ONU ID or ONU logical link identity information, or physical identity information of the ONU, in the PON system to the ONU to be registered. In some exemplary implementations, the OLT sends an equalization delay value of the ONU to be registered to the ONU to be registered, and the registration of the ONU to be registered is completed.

In the foregoing operation 5, if the OLT detects the conflicting uplink signals sent by a plurality of ONUs to be registered in the silent window, the OLT instructs the first group of ONUs to be registered to generate a large random delay, for example, greater than 125 us, and the OLT returns to operation 4 to continue registration.

The OLT performs ranging on other groups of ONUs to be registered by using the foregoing operations, so as to complete the registration of all the ONUs to be registered.

Example 2

In this example, identity information of all ONUs, such as serial number information or MAC address information of the ONUs, is stored at the OLT. The OLT and the ONU transmit data and receive data by using the following operations.

In operation 1, the OLT sends a broadcast message to at least one ONU, wherein the message content is a sequence code with a specific value.

In operation 2, the ONU stores information of the sequence code with the specific value sent by the OLT.

In operation 3, the OLT instructs an ONU whose serial number is S in a to-be-registered and to-be-activated state to send an uplink signal, and the OLT opens a silent window with a time length smaller than an allowable delay of a low latency service.

In operation 4, the ONU with the serial number of S sends an optical signal with a low optical power at a low rate, and the content of the optical signal is the sequence code with the specific value in operation 1. For example, the uplink transmission time required for the sequence code with the specific value at this rate may be equal to 125 us. As another example, the ONU may send the sequence code with the specific value multiple times).

In operation 5, the OLT detects the uplink data sent by the ONU in the silent window in operation 3, acquires a time at which the first bit of the sequence code with the specific value sent by the ONU arrives at the OLT according to the detected data content and the rate of the ONU, and then calculates the round-trip delay of the ONU. The round-trip delay value includes a transmission delay of the data sent by the OLT to the ONU in the optical fiber, a response time of the ONU, and a transmission time of the data sent by the ONU to the OLT in the optical fiber. The round-trip delay=a time at which the OLT receives the data sent by the ONU-a time at which the OLT sends the downlink data.

When the OLT has known a response time of the ONU, the OLT may calculate the length of the optical fiber between the ONU and the OLT according to a round-trip delay value $TRTT=L/Cd+L/Cu+Tres$, where L is the length of the optical fiber between the OLT and the ONU, Cd is an optical speed of a downlink optical signal, Cu is an optical speed of an uplink optical signal, Tres is the response time of the ONU, and TRTT is the round-trip delay of the ONU. The OLT performs the preliminary ranging on the ONU.

The OLT instructs the ONU to send uplink data at a start time $T_1$.

The OLT opens a silent window with a time length smaller than the allowable delay of the low latency service according to the arrival time of the ONU after restoring the rate of the PON system.

In operation 6, the ONU with the serial number of S recovers the rate and transmission optical power of the ONU to the normal value of the PON system, and then transmits uplink data at the start time $T_1$.

In operation 7, after receiving the data sent by the ONU in operation 6, the OLT performs ranging on the ONU to obtain a round-trip delay of the ONU (the round-trip delay of the ONU=the time at which the OLT receives the data of the ONU—the time at which the OLT sends the downlink data-$T_1$).

In some exemplary implementations, the OLT sends the ranging result of the ONU to the ONU whose serial number is S, and the registration of the ONU is completed.

The OLT repeats the above operations to complete ranging for all ONUs that need to be registered in the PON system one by one, and sends ranging results to the ONUs, thereby completing the registration process of the ONUs.

Example 3

In this example, to prevent the OLT from opening a large silent window for registration of the ONUs to be registered, the ONUs to be registered support two signal sending modes. In the initial stage of registration, the ONU to be registered may support sending a low-power (for example, sending an optical signal with a power less than −30 dBm) low-rate signal $S_d$ (for example, an uplink rate less than 10 Mbps) in response to the bandwidth allocated by the OLT. When the ONU to be registered sends a low-rate low-power signal, a registered ONU may send uplink data normally. The OLT normally allocates an uplink bandwidth to a registered ONU, and the registered ONU sends an uplink signal. Meanwhile, the OLT periodically sends a message to the ONU to be registered to notify the ONU to be registered to send an uplink signal. The ONU to be registered responds to the OLT by sending an uplink signal with a low power at a low rate. Because the low-rate low-power uplink signal overlaps with the normal uplink data signal sent by the registered ONU, the low-rate low-power signal is submerged in the normal uplink data signal sent by the registered ONU. In order to detect a low-rate low-power signal of an ONU to be registered, an OLT opens a small silent window (for example, several microseconds) in each frame, and the OLT does not allocate uplink bandwidth to any registered ONU in the time corresponding to the silent window. Hence, in this period of time, the OLT can detect the low-rate low-power uplink signal sent by the ONU to be registered. To help the OLT to more accurately determine the value of the low-rate low-power uplink signal sent by the ONU to be registered, the ONU to be registered may continuously send a plurality of low-rate low-power uplink signals. The OLT opens a small silent window at the same period of time in each 125 us, and the OLT averages the values of the detected low-rate low-power uplink signals sent by the ONU to be registered, so as to obtain a more accurate value of data carried in the uplink signals sent by the ONU to be registered. The OLT knows the value of a complete low-rate low-power uplink signal sent by the ONU to be registered. Therefore, according to the value of the partial low-rate low-power uplink signal detected in the silent window, the OLT can deduce the position of this segment of data in the complete low-rate low-power uplink signal. The OLT can further deduce the time $T_3$ at which the first bit of the low-rate low-power uplink signal of the ONU to be registered arrives at the OLT according to the uplink rate of the ONU to be registered and the information about the known complete data sent by the ONU to be registered (for example, according to the received data segment, the OLT obtains the data length L between the sent data segments according to the known complete data sent by the ONU to be registered, and obtains the time $T_3=T_2-L/S_d$ at which the data sent by the ONU to be registered arrives at the OLT, where $S_d$ is the value of the low rate the ONU to be registered adopts for sending in the registration phase). According to the foregoing information, the OLT can determine that the round-trip delay (RTD) of the ONU to be registered is $T_3-T_1$, so as to complete the coarse ranging of the ONU to be registered.

In the described solution, if a collision signal is detected at an OLT when a plurality of ONUs to be registered are registered at the same time, the OLT may instruct the ONUs to be registered to generate a random delay and then resend an uplink signal, thereby reducing the probability of collision. Afterward, the OLT performs coarse ranging on the ONUs to be registered according to the foregoing method.

After performing coarse ranging on a certain ONU to be registered, for example, an ONU1, the OLT instructs the ONU1 to send the identity (ID) information of the ONU1 to the OLT by carrying the ID information of the ONU1 in a low-rate low-power signal.

After receiving an instruction from the OLT, the ONU1 carries identity information (for example, serial number information, media access address information, or other registration information) of the ONU1 in a low-rate low-power uplink signal, and sends the low-rate low-power uplink signal to the OLT.

After receiving the identity information of the ONU1, the OLT sends, at a time $T_4$, a bandwidth used for ranging to the ONU1, and opens, according to a result of the coarse ranging on the ONU1, a silent window (with a length of, for example, a few microseconds) near the time at which data sent by the ONU1 at a restored transmission rate of service data in the PON system arrives at the OLT.

After receiving the foregoing instruction from the OLT, the ONU1 restores the rate and optical power of the ONU1 to be the operation rate and optical power supported by the current PON system, and sends the uplink signal to the OLT in the bandwidth allocated by the OLT in response to the ranging instruction of the OLT.

The OLT accurately obtains the round-trip delay (i.e., RTD)=$T_5-T_4$ of the ONU1 at the normal rate according to the time $T_4$ at which the OLT sends the downlink data and the time $T_5$ at which the OLT receives the data from the ONU.

Example 4

In this example, to prevent the OLT from opening a large silent window for registration of the ONUs to be registered, the ONUs to be registered support two signal sending modes. In the initial stage of registration, the ONU to be registered may support sending a low-power (for example, sending an optical signal with a power less than −30 dBm) low-rate signal $S_d$ (for example, an uplink rate less than 10 Mbps) in response to the bandwidth allocated by the OLT. When the ONU to be registered sends a low-rate low-power signal, a registered ONU may send uplink data normally.

The OLT normally allocates an uplink bandwidth to the registered ONU, and the registered ONU sends an uplink signal.

Meanwhile, the OLT sends a message to the ONU to be registered at the time $T_1$, and notifies the ONU to be registered to send an uplink signal. The ONU to be registered responds to the OLT by sending an uplink signal with a low power at a low rate. Because the low-rate low-power uplink signal overlaps with the normal uplink data signal sent by the registered ONU, the low-rate low-power signal is submerged in the normal uplink data signal sent by the registered ONU. In order to detect a low-rate low-power signal of an ONU to be registered, an OLT opens a small silent window (for example, several microseconds) in each frame, and the OLT does not allocate uplink bandwidth to any registered ONU in the time corresponding to this silent window. Hence, in this period of time, the OLT can detect the low-rate low-power uplink signal sent by the ONU to be registered. To help the OLT to more accurately determine the value of the low-rate low-power uplink signal sent by the ONU to be registered, the ONU to be registered may continuously send a plurality of low-rate low-power uplink signals. The OLT opens a small silent window at the same period of time in each 125 us, and the OLT averages the values of the detected low-rate low-power uplink signals sent by the ONU to be registered, so as to obtain a more accurate value of data carried in the uplink signals sent by the ONU to be registered. The frame content of the low-rate low-power signal sent by the ONU to be registered carries the identity information of the ONU to be registered (for example, the serial number information of the ONU to be registered, the media access address information, or other registration information).

According to the value of the partial low-rate low-power uplink signal detected in the silent window, the OLT can deduce the position of this segment of data in the complete low-rate low-power uplink signal. The OLT can further deduce the time $T_2$ at which the first bit of the data sent by the ONU to be registered arrives at the OLT. According to the foregoing information, the OLT can determine that the round-trip delay (RTD) of the ONU to be registered is $T_2-T_1$, so as to complete the coarse ranging of the ONU to be registered.

In the described solution, if a collision signal is detected at an OLT when a plurality of ONUs to be registered are registered at the same time, the OLT may instruct the ONUs to be registered to generate a random delay and then resend an uplink signal, thereby reducing the probability of collision. Afterward, the OLT performs coarse ranging on the ONUs to be registered according to the foregoing method.

After performing coarse ranging on a certain ONU, for example, an ONU1, the OLT sends a unicast message to the ONU1 to be registered at a time $T_3$ to allocate a ranging uplink bandwidth to the ONU1. The OLT opens, according to the result of the coarse ranging for the ONU1, a silent window (with a length of, for example, several microseconds), near the time at which data sent by the ONU1 at a restored transmission rate of service data in the PON system, arrives at the OLT.

After receiving the foregoing instruction from the OLT, the ONU1 restores the rate and optical power to be the operation rate and optical power supported by the current PON system, and sends the uplink signal to the OLT in the bandwidth allocated by the OLT in response to the ranging instruction of the OLT.

The OLT accurately obtains the round-trip delay (i.e., RTD)=$T_4-T_3$ of the ONU1 at the normal rate according to the time $T_3$ at which the ONU1 sends the downlink data and the time $T_4$ at which the OLT receives the data from the ONU1.

In this example, the OLT may reduce a silent window used for ranging based on the result of the previous coarse ranging performed on the ONU, so as to ensure a low latency requirement for transmitting a service on the uplink.

Embodiments of the present disclosure also provide a computer readable storage medium, on which a computer program is stored. The computer program is configured to execute the operations of the ranging method for the optical network according to the embodiments of the present disclosure at runtime.

According to some embodiments provided in the present disclosure, the storage medium may be configured to store a computer program for executing the following operations. In operation S1, an OLT sends a bandwidth allocation message to an ONU. In operation S2, the OLT receives a response message sent by the ONU in a first sending mode, wherein the response message is generated by the ONU according to the bandwidth allocation message, and the first sending mode includes a sending power and a transmission rate. In operation S3, the OLT performs ranging on the ONU for the first time according to the response message.

According to some embodiments provided by the present disclosure, the computer readable storage medium may include, but is not limited to, any medium that can store a computer program, such as a USB flash drive, a Read-Only Memory (ROM for short), a Random Access Memory (RAM for short), a mobile hard disk, a magnetic disk, or an optical disc.

Embodiments of the present disclosure also provide an electronic apparatus, including a memory and a processor. The memory stores a computer program. The processor is configured to run the computer program to execute operations of a ranging method for an optical network provided in the embodiments of the present disclosure.

According to some embodiments provided by the present disclosure, the electronic apparatus may further include a transmission device and an input/output device, wherein the transmission device is connected to the processor, and the input/output device is connected to the processor.

According to some embodiments of the present disclosure, the processor may be configured to perform the following operations based on a computer program. In operation S1, an OLT sends a bandwidth allocation message to an ONU. In operation S2, the OLT receives a response message sent by the ONU in a first sending mode, wherein the response message is generated by the ONU according to the bandwidth allocation message, and the first sending mode includes a sending power and a transmission rate. In operation S3, the OLT performs ranging on the ONU for the first time according to the response message.

Specific examples in the embodiments of the present disclosure may refer to the examples described in the described embodiments and exemplary embodiments, and will not be elaborated in this embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A ranging method for an optical network, comprising:
    performing, by an Optical Line Terminal (OLT), coarse ranging on an Optical Network Unit (ONU) to be registered to determine a first distance between the ONU to be registered and the OLT;
    sending, by the OLT at a first time $T_1$, a first message to the ONU to be registered, wherein the first message carries a first uplink bandwidth allocated by the OLT to the ONU to be registered;
    estimating, by the OLT according to the first distance, a time at which a first uplink signal, which is sent on the first uplink bandwidth in a first sending mode by the ONU to be registered in response to the first message, arrives at the OLT, and opening, by the OLT, a corresponding first silent window;
    receiving, by the OLT, the first uplink signal at a second time $T_2$ within the first silent window; and
    determining, by the OLT, a second distance between the ONU to be registered and the OLT according to the first time $T_1$ and the second time $T_2$.

2. The method according to claim 1, wherein determining, by the OLT, the second distance between the ONU to be registered and the OLT according to the first time $T_1$ and the second time $T_2$ comprises:
    determining, by the OLT, that a first round-trip delay RTD1 of the ONU to be registered is equal to $T_2-T_1$; and
    determining, by the OLT, the second distance according to the first round-trip delay RTD1 and a pre-obtained transmission rate of an optical signal in an optical fiber.

3. The method according to claim 1, wherein performing, by the OLT, the coarse ranging on the ONU to be registered to determine the first distance between the ONU to be registered and the OLT comprises:
    broadcasting, by the OLT, a second message at a set time $T_3$ of a ranging period, wherein the second message carries a sequence code with a specific value and a second uplink bandwidth;
    opening, by the OLT, a second silent window within a set time period of the ranging period, wherein a time length of the second silent window is less than an allowable delay of a low latency service;
    receiving, by the OLT in the second silent window, a second uplink signal sent on the second uplink bandwidth in a second sending mode by the ONU to be registered in response to the second message, wherein the second uplink signal is used for transmitting the sequence code with the specific value, and a sending power and/or a signal transmission rate under the second sending mode is less than a sending power and/or a signal transmission rate under the first sending mode; and
    determining, by the OLT, the first distance between the ONU to be registered and the OLT according to the set time $T_3$, the received second uplink signal, and a receiving time $T_4$ of the second uplink signal.

4. The method according to claim 3, wherein determining, by the OLT, the first distance between the ONU to be registered and the OLT according to the set time $T_3$, the received second uplink signal, and the receiving time $T_4$ of the second uplink signal comprises:
    determining, by the OLT, one or more segments of the sequence code with the specific value in the received second uplink signal received at the receiving time $T_4$;
    determining, by the OLT according to the sequence code with the specific value and the one or more segments of the sequence code with the specific value in the second uplink signal received at the receiving time $T_4$, a length of the sequence code with the specific value transmitted by the ONU to be registered that has arrived at the OLT at the receiving time $T_4$;
    determining, by the OLT, a time $T_5$ at which a first code in the sequence code with the specific value transmitted by the ONU to be registered arrives at the OLT as $T_5=T_4-L/S_d$, wherein $S_d$ is a signal transmission rate in the second sending mode; and
    determining, by the OLT, that a second round-trip delay RTD2 of the ONU to be registered is equal to $RTD2=T_5-T_3$, and determining, by the OLT, the first distance according to the second round-trip delay RTD2 and a pre-obtained transmission rate of an optical signal in an optical fiber.

5. The method according to claim 3, wherein before performing, by the OLT, the coarse ranging on the ONU to be registered, the method further comprises:
    dividing, by the OLT, all ONUs supported by the OLT into a plurality of ONU groups, and respectively allocating, by the OLT, a corresponding group identifier to each of the plurality of ONU groups; and
    the second message further carries a group identifier of one ONU group of a plurality of ONU groups corresponding to the ranging period, and is used for instructing the ONU to be registered in the ONU group to send the second uplink signal on the second uplink bandwidth in the second sending mode in response to the second message.

6. An Optical Line Terminal (OLT), comprising a memory storing instructions and a processor in communication with the memory, wherein the processor is configured to execute the instruction to
    execute the method according to claim 1.

7. A ranging method for an optical network, comprising:
    communicating, by an Optical Network Unit (ONU) to be registered, with an Optical Line Terminal (OLT), so that the OLT performs coarse ranging on the ONU to be registered to determine a first distance between the ONU to be registered and the OLT;
    receiving, by the ONU to be registered, a first message sent by the OLT at a first time $T_1$, wherein the first message carries a first uplink bandwidth allocated by the OLT to the ONU to be registered; and
    in response to the first message, sending, by the ONU to be registered, a first uplink signal on the first uplink bandwidth in a first sending mode, so that the OLT receives the first uplink signal in a first silent window, and determines a second distance between the ONU to be registered and the OLT according to the first time $T_1$ and a second time $T_2$ at which the OLT receives the first uplink signal;

wherein the first silent window is opened after the OLT estimates, according to the first distance, a time at which the first uplink signal arrives at the OLT.

8. The method according to claim 7, wherein communicating, by the ONU to be registered, with the OLT, so that the OLT performs the coarse ranging on the ONU to be registered to determine the first distance between the ONU to be registered and the OLT comprises:

receiving, by the ONU to be registered, a second message broadcast by the OLT at a set time $T_3$ of a ranging period, wherein the second message carries a sequence code with a specific value and a second uplink bandwidth; and in response to the second message, sending, by the ONU to be registered, a second uplink signal used for transmitting the sequence code with the specific value on the second uplink bandwidth in a second sending mode, so that the OLT receives the second uplink signal in a second silent window opened within a set time period of the ranging period, and determines the first distance between the ONU to be registered and the OLT according to the set time $T_3$, the received second uplink signal, and a receiving time $T_4$ of the second uplink signal;

wherein a time length of the second silent window is less than an allowable delay of a low latency service, and a sending power and/or a signal transmission rate under the second sending mode is less than a sending power and/or a signal transmission rate under the first sending mode.

9. The method according to claim 8, wherein the second message further carries a group identifier of an ONU group corresponding to the ranging period; and before in response to the second message, sending, by the ONU to be registered, the second uplink signal on the second uplink bandwidth, the method further comprises: determining, by the ONU to be registered, that a group identifier stored in the ONU to be registered is the same as the group identifier of the ONU group carried in the second message, wherein the group identifier stored in the ONU to be registered is allocated to the ONU group including the ONU to be registered after the OLT divides all ONUs supported by the OLT into a plurality of ONU groups.

10. An Optical Network Unit (ONU), comprising a memory storing instructions and a processor in communication with the memory, wherein the processor is configured to execute the instruction to execute the method according to claim 7.

11. A ranging method for an optical network, applied to an Optical Line Terminal (OLT) and comprising:

sending a bandwidth allocation message to an Optical Network Unit (ONU);

receiving a response message sent by the ONU in a first sending mode, wherein the first sending mode comprises a sending power and a transmission rate; and performing ranging on the ONU according to the response message.

12. The method according to claim 11, after performing the ranging on the ONU according to the response message, further comprising:

sending downlink data to the ONU, wherein the downlink data carries a bandwidth allocation message;

receiving an uplink signal sent by the ONU in a second sending mode in response to the bandwidth allocation message, wherein a sending power and a transmission rate under the second sending mode are higher than the sending power and the transmission rate under the first sending mode; and performing ranging on the ONU according to a receiving time of the uplink signal.

13. The method according to claim 12, wherein performing the ranging on the ONU according to the receiving time of the uplink signal comprises:

determining a sending time of the downlink data and a receiving time of the uplink signal; and calculating a difference between the receiving time and the sending time to obtain a round-trip delay (RTD) of the ONU.

14. The method according to claim 11, wherein receiving the response message sent by the ONU in the first sending mode comprises: receiving, in a predetermined opened silent window, the response message sent by the ONU in the first sending mode, wherein the predetermined opened silent window corresponds to a non-operating bandwidth.

15. The method according to claim 11, wherein performing the ranging on the ONU according to the response message comprises:

obtaining the response message;

determining, according to content of the response message, a specified time at which a first bit of an uplink data frame sent by the ONU arrives at the OLT; and calculating a distance between the ONU and the OLT based on the specified time.

16. The method according to claim 11, after receiving the response message sent by the ONU in the first sending mode, further comprising:

determining that response messages of a plurality of ONUs are received in a same period; and instructing the ONU to resend the response message after generating a random delay.

17. The method of claim 11, wherein the sending power under the first sending mode is less than a standard power of a Passive Optical Network (PON) system, and the transmission rate under the first sending mode is less than a standard rate of the PON system.

18. The method of claim 11, wherein the bandwidth allocation message sent to the ONU comprises:

a group number of a group among groups into which a plurality of ONUs under control of the OLT are divided; and a bandwidth message allocated to the ONU corresponding to the group number.

19. The method according to claim 11, wherein sending the bandwidth allocation message to the ONU comprises:

sending a unicast message to the ONU, wherein the unicast message carries a serial number or a media access control address of the ONU.

20. The method according to claim 11, after performing the ranging on the ONU according to the response message, further comprising:

instructing a target ONU to be registered to send, after generating a random delay, an uplink signal in the first sending mode;

receiving the uplink signal;

by comparing data content of uplink data in the uplink signal with a complete sequence code with a specific value, obtaining a time at which a first bit of the sequence code with the specific value transmitted by the target ONU arrives at the OLT; and calculating a round-trip delay of the target ONU according to the obtained time, or, opening a silent window with a time length smaller than an allowable delay of a low latency service for the ONU;

or, instructing an ONU to be registered to send identity information of the ONU to be registered to the OLT in the first sending mode.

* * * * *